US011788684B1

(12) United States Patent
Stavropoulos et al.

(10) Patent No.: US 11,788,684 B1
(45) Date of Patent: Oct. 17, 2023

(54) STEAM TRAP CONSTRUCTION WITH EASE OF ACCESS FOR MAINTENANCE

(71) Applicant: STEAMGARD, LLC, Vernon Hills, IL (US)

(72) Inventors: Constantine N. Stavropoulos, Northbrook, IL (US); Charles N. Miller, Grayslake, IL (US)

(73) Assignee: STEAMGARD, LLC, Vernon Hills, IL (US)

( * ) Notice: Subject to any disclaimer, the term of this patent is extended or adjusted under 35 U.S.C. 154(b) by 0 days.

(21) Appl. No.: 17/962,483

(22) Filed: Oct. 8, 2022

(51) Int. Cl.
*F16T 1/34* (2006.01)

(52) U.S. Cl.
CPC ........... *F16T 1/34* (2013.01); *Y10T 137/3021* (2015.04); *Y10T 137/794* (2015.04)

(58) Field of Classification Search
CPC ... F16T 1/34; F16T 1/00–48; Y10T 137/3021; Y10T 137/794–8122
USPC ....... 137/177, 179, 203, 204, 334, 549, 182, 137/183, 886, 887, 269, 454.6, 554–550; 138/41, 44, 45; 236/55–60, 92 B, 92 C, 236/92 D; 55/466, 190, 191, DIG. 23; 62/222, 224
See application file for complete search history.

(56) References Cited

U.S. PATENT DOCUMENTS

| | | | | |
|---|---|---|---|---|
| 1,163,316 A | * | 12/1915 | Brown | F16K 3/188 236/59 |
| 1,639,208 A | * | 8/1927 | Basenau | F24D 19/081 138/40 |
| 1,846,226 A | * | 2/1932 | Smith | F24D 19/081 236/56 |
| 1,973,259 A | * | 9/1934 | Kiefer | F16T 1/34 137/177 |

(Continued)

FOREIGN PATENT DOCUMENTS

| | | | | |
|---|---|---|---|---|
| DE | 816398 C | * | 10/1951 | |
| GB | 2304300 A | * | 3/1997 | ............... F16T 1/34 |
| WO | WO-2021130249 A1 | * | 7/2021 | ............... F16T 1/16 |

OTHER PUBLICATIONS

Shah, H. et al., "Venturi Steam Trap—Functional Laboratory Study," Gas Technology Inst., Des Plaines, IL (Mar. 26, 2019).

(Continued)

*Primary Examiner* — Craig J Price
(74) *Attorney, Agent, or Firm* — David M. Quinlan, P.C.

(57) ABSTRACT

A steam trap includes a replaceable condensate nozzle cartridge with a through passage forming a venturi nozzle in a straight-line working fluid flow path. The venturi through passage includes a venturi nozzle insert that reduces the pressure of the working fluid to cause the liquid water in the working fluid to flash and restrict the flow of steam through the passage. The condensate nozzle is located in a reduced pressure discharge chamber into which a nozzle outlet discharges water condensate extracted by the nozzle and (Continued)

emptied from a trap outlet. The reduced pressure discharge chamber has an access opening sealed by a removable cover to allow the nozzle cartridge to be removed and replaced if necessary, without removing the steam trap from the process line. Locating the removable nozzle cartridge in a lower pressure region of the steam trap overcomes rating limitations on prior steam traps with replaceable venturi nozzles.

20 Claims, 7 Drawing Sheets

(56) References Cited

U.S. PATENT DOCUMENTS

| | | | | | |
|---|---|---|---|---|---|
| 2,051,732 | A | * | 8/1936 | McKee | F16T 1/16 251/117 |
| 2,127,649 | A | * | 8/1938 | McKee | F16T 1/34 251/117 |
| 2,636,506 | A | * | 4/1953 | St Clair | F16L 55/07 137/549 |
| 2,746,250 | A | * | 5/1956 | Hawkins | B64C 25/44 261/78.2 |
| 2,783,770 | A | * | 3/1957 | Richter | F16T 1/34 137/559 |
| 2,988,101 | A | * | 6/1961 | Mueller | F16T 1/165 137/183 |
| 2,989,976 | A | * | 6/1961 | Kinderman | F16T 1/16 137/183 |
| 3,302,878 | A | * | 2/1967 | Fujiwara | F16T 1/10 236/56 |
| 3,715,870 | A | | 2/1973 | Guzick | |
| 3,724,751 | A | * | 4/1973 | Fujiwara | F16T 1/165 236/59 |
| 3,877,895 | A | | 4/1975 | Wonderland et al. | |
| 3,893,473 | A | * | 7/1975 | Breece | F16T 1/34 137/203 |
| 4,073,306 | A | * | 2/1978 | Neyer | F16T 1/12 236/59 |
| 4,105,721 | A | * | 8/1978 | Schliebe | C02F 3/1294 138/44 |
| 4,134,541 | A | * | 1/1979 | Beatty | F16T 1/02 236/59 |
| 4,171,209 | A | | 10/1979 | Brown | |
| 4,288,032 | A | * | 9/1981 | Hetz | F16T 1/10 137/183 |
| 4,426,213 | A | | 1/1984 | Stavropoulos | |
| 4,541,456 | A | | 9/1985 | Troy | |
| 4,592,381 | A | * | 6/1986 | Troy | F16T 1/34 137/203 |
| 4,644,974 | A | * | 2/1987 | Zingg | B05B 1/00 138/40 |
| 4,662,401 | A | * | 5/1987 | Zingg | F15C 1/20 138/44 |
| 4,745,943 | A | * | 5/1988 | Mortensen | F16T 1/34 138/44 |
| 5,060,686 | A | | 10/1991 | Troy | |
| 5,088,518 | A | * | 2/1992 | Stamatakis | F16T 1/34 138/44 |
| 5,120,336 | A | * | 6/1992 | LeBlanc | F16T 1/34 55/466 |
| 5,123,452 | A | * | 6/1992 | LeBlanc | F16T 1/34 138/44 |
| 5,137,556 | A | * | 8/1992 | Koulogeorgas | B01D 46/24 96/194 |
| 5,406,974 | A | * | 4/1995 | Griswold | B01D 35/157 137/454.6 |
| 5,676,719 | A | | 10/1997 | Stavropoulos et al. | |
| 5,948,128 | A | | 9/1999 | Stavropoulos et al. | |
| 6,148,844 | A | * | 11/2000 | Stamatakis | F16T 1/165 137/183 |
| 6,148,845 | A | * | 11/2000 | Borowski | F16T 1/38 137/183 |
| 7,316,241 | B1 | * | 1/2008 | Sharp, Jr. | F16T 1/165 137/183 |
| 7,690,212 | B2 | * | 4/2010 | Narayanamurthy | F25B 41/33 62/224 |
| 8,109,107 | B2 | * | 2/2012 | Narayanamurthy | F25B 41/33 236/92 B |
| 9,121,549 | B2 | * | 9/2015 | Mawby | F16T 1/34 |
| 10,941,903 | B2 | * | 3/2021 | Baik | F16T 1/14 |
| 11,242,954 | B2 | * | 2/2022 | Katsura | F16T 1/16 |
| 11,480,295 | B2 | * | 10/2022 | Katsura | B01D 35/02 |
| 2009/0044868 | A1 | * | 2/2009 | Chiang | F16T 1/38 137/183 |

OTHER PUBLICATIONS

"Delta Venturi Steam Traps," Product Brochure, Delta Steam Systems Pty. Ltd., Cape Town, So. Africa (copyright 2011).
Product Data Sheet, Delta Steam Systems DSV25 Venturi Steam Trap, Specification Sheet, Delta Steam Systems Pty Ltd., Cape Town, So. Africa (copyright 2011).
Product Data Sheet, Delta Steam Systems DSV15/20 Venturi Steam Trap, Specification Sheet, Delta Steam Systems Pty. Ltd., Cape Town, So. Africa (copyright 2011).
Product Data Sheet, Delta Steam Systems DSV-FWN Venturi Steam Trap, Specification Sheet, Delta Steam Systems Pty. Ltd., Cape Town, So. Africa (copyright 2011).

* cited by examiner

STEAM TRAP CONSTRUCTION WITH EASE OF ACCESS FOR MAINTENANCE

BACKGROUND

Steam traps are essential to the proper operation of installations that use steam as a working fluid. Condensate forms in apparatus process lines as heat is extracted from the steam, causing a decrease in the steam temperature and the formation of a liquid fraction (water) and a gaseous fraction (steam) in the process line. A steam trap removes the condensed liquid water while retaining ("trapping") the high temperature steam. This enhances the thermodynamic efficiency of the apparatus by retaining steam that has already been generated while extracting the condensate to prevent potential damage resulting from phenomena such as water hammer. Retaining steam also reduces operational costs by reducing the amount of additional steam that must be produced to replace condensate, allowing the extracted condensate to be recycled to reduce the amount of replacement water that must be introduced for continuous steam generation.

There are various categories of steam traps, but one of the most popular is a so-called venturi steam trap that uses a restricted passage as a venturi nozzle that accelerates the hot steam/condensate mixture to reduce its pressure. This causes some of the condensate in the mixture to re-evaporate, which inhibits the passage of steam through the venturi while allowing condensate through. Venturi steam traps are widely used because of their lack of moving parts, long service life, and ability to extract condensate from the working fluid while retaining a large portion of the steam fraction. FIGS. 1 and 2 represent one example of a prior art venturi-type steam trap SP. FIG. 1 is a side elevational view of the steam trap, and FIG. 2 is a cross-sectional view, taken through the steam trap in the plane of the drawing, depicting the flow path of the working fluid. These figures are based on information published by Delta Steam Systems Pty Ltd (11 Rivers Edge Business Park, Winelands Close, Stikland, 7530, Cape Town, South Africa) on its DSV25 Venturi Steam Trap.

The steam trap SP comprises a unitary body SB with a threaded trap inlet TI that accepts a process line (not shown) of an apparatus that uses steam as a working fluid. The general direction of flow through the steam trap SP is indicated by the features embossed on the trap body denoted by the letters F in FIG. 1. Referring to FIG. 2, the trap body SB forms an internal flow path FP for hot working fluid introduced to the trap inlet TI. The flow path FP leads to the interior of a hollow perforated cylinder ST that acts as a primary strainer for removing large particulates from the working fluid. The strainer ST is held in place in a strainer compartment SC by a bottom cap BC. The steam/condensate mixture travels from the strainer compartment SC through a vertical passage UP upward to a venturi chamber VC at the top of the trap body SB. After passing through a secondary strainer SS, the fluid enters the inlet VI of a venturi nozzle VN, which forms a through-passage with a reduced diameter portion RD followed by a larger diameter outlet portion LD. The working fluid accelerates as it passes through the smaller diameter, which reduces the fluid pressure. This causes some of the condensate in the fluid to re-evaporate ("flash"), thereby blocking the passage of steam while allowing condensate to pass. The condensate exits the venturi nozzle via the larger diameter portion LD and is directed to a steam trap outlet TO.

The steam/condensate mixture flowing through the venturi nozzle can be at pressures up to 3,000 psig or more and at temperatures that can reach or exceed 950° F. These temperatures and pressures, coupled with the increase in fluid velocity through the reduced diameter portion RD of the venturi nozzle, make the nozzle especially vulnerable to erosion. Venturi nozzles are typically held to close tolerances since their proper functioning depends on matching to the greatest degree possible their flow characteristics and the process conditions for which they are designed. Accordingly, they need to be accessible for inspection, and if necessary, replacement, to prevent compromising their performance.

The vertical steam trap design in FIGS. 1 and 2 provides access to the venturi nozzle VN via an access cap AC threaded onto the top of the trap body SB to seal the venturi chamber VC. However, this is not an optimum solution for several reasons. First, it limits the rating of the steam trap. Since the venturi chamber is at the elevated system pressure and temperature, the ability of the cap to seal the venturi chamber is limited by the extent to which the threads CT on the trap body and cap can withstand sheer forces exerted by the hot, high pressure fluid within the venturi chamber. Moreover, the necessity of putting the venturi chamber at the top of the steam trap SP to provide access to the venturi nozzle VN complicates the task of matching the flow rates and pressures at the steam trap and those in the process line. As seen in FIG. 2, this placement of the venturi chamber forces the flow entering at the inlet TI to turn 90° to reach the venturi chamber VC, another 180° to exit the venturi chamber through the venturi nozzle VN, and still another 90° to exit the trap outlet TO. This serpentine flow path makes it particularly difficult to minimize differences between steam trap and process line pressures and flow rates, especially since the working fluid comprises at least two media (gaseous steam and liquid condensate) that travel at different velocities and experience considerable flow turbulence. Still another shortcoming of this design is that the swirling high temperature working fluid within the small venturi chamber VC makes its surfaces susceptible to erosion, as is the indicated location of the trap body wall TW where it turns the hot condensate exiting the venturi outlet 90° toward the trap outlet TO.

A particularly advantageous venturi steam trap, patented by one of the co-inventors in U.S. Pat. No. 4,426,213, avoids those problems by a structure that introduces the process fluid into a venturi nozzle and then out the steam trap outlet-without complex flow patterns or sharp changes in the direction of the flow from its entrance at the trap inlet to its exit at the steam trap outlet. This steam trap design has proven to be very successful commercially because it facilitates making the characteristics of the flow through the steam trap compatible with those of the process line to which it is connected, thus avoiding problems such as water hammer and excess retention of condensate. SteamGard LLC (730 Forest Edge Drive, Vernon Hills, IL 60061) has sold steam traps based on the straight-line flow construction in the '213 patent for more than 40 years. These STEAMGARD™ steam traps have proven to have a long operational life and to effectively remove condensate and retain steam at extreme pressures and temperatures. However, gaining access to the interior of the steam trap for cleaning, maintenance and replacement of wear items (such as the venturi nozzle), requires removal of the entire steam trap from the process line to provide access to the trap interior. The significant operational advantages of STEAMGARD™ steam traps with straight-line flow have contributed to their commercial success, but a construction that also enables maintenance and part replacement without major disruption of operations would be even more advantageous.

SUMMARY OF THE DISCLOSURE

One object of the steam trap constructions described herein is the avoidance of the shortcomings of known prior art venturi-style steam traps that provide access to a replaceable venturi nozzle.

In one aspect the disclosed steam trap comprises a steam trap body including a condensate nozzle with a through passage forming a removably mounted venturi nozzle. The venturi nozzle is disposed in a reduced pressure discharge chamber in the steam trap body into which the venturi nozzle discharges extracted liquid condensate. The lower pressure discharge chamber has an access opening by which the condensate nozzle can be accessed via a removable cover. This provides access to the venturi nozzle without removing the steam trap from a process line, as in the prior construction in FIGS. 1 and 2, absent the limit on steam trap rating like that construction with its venturi nozzle only accessible through a cap on the high pressure side of the venturi nozzle.

In another aspect the steam trap construction described herein also preserves the advantages of straight-line flow in matching flow characteristics of the working fluid in the process line with those in the steam trap. The changes in direction of the flow path in prior art constructions with accessible venturi nozzles, coupled with substantial turbulence in the venturi chamber, make it difficult to match the pressure of the working fluid entering the trap inlet with the pressure at the venturi nozzle. This results in maximizing the percentage of condensate removed from the working fluid and the amount of steam left behind.

Other aspects of the disclosed new steam trap include operational versatility by virtue of constructing the venturi nozzle as part of a replaceable condensate-removal nozzle cartridge comprising a nozzle holder with a separate, replaceable venturi nozzle insert. The nozzle holder includes a mounting portion for securing the cartridge in the discharge portion where it can be conveniently accessed by removing the access cover. Different nozzle holders and different nozzle inserts can be mixed and matched to provide nozzle cartridges with a wide variety of specifications usable in multiple steam trap body sizes and styles.

This Summary is provided solely to introduce in a simplified form a limited selection of important concepts embodied in the apparatus and methods described in detail further below. It is not intended necessarily to identify key or essential and novel features of the subject matter described herein, nor is it intended to be limit the scope of any claim directed to such subject matter.

BRIEF DESCRIPTION OF THE DRAWINGS

The objects of the invention will be better understood from the detailed description of its preferred embodiments which follows below, when taken in conjunction with the accompanying drawings, in which like numerals and letters refer to like features throughout. The following is a brief identification of the drawing figures used in the accompanying detailed description.

Figure 1:
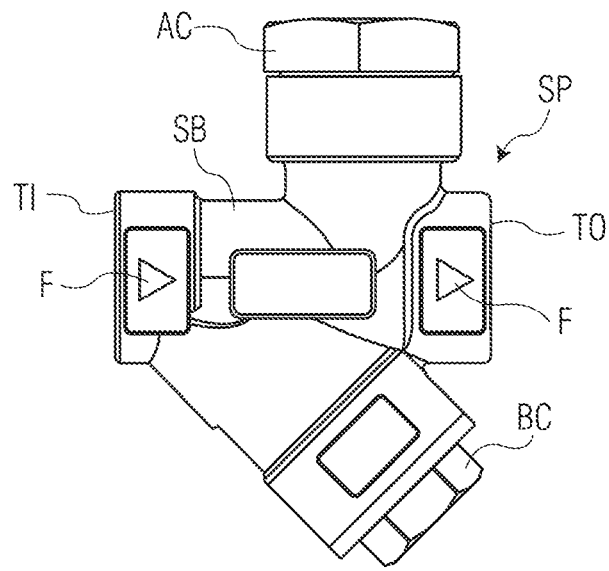
FIG. 1 is a side elevational view of the prior art steam trap SP discussed above.

One skilled in the art will readily understand that the drawings are not strictly to scale, but nevertheless will find them sufficient, when taken with the detailed descriptions of preferred embodiments that follow, to make and use the present invention.

DETAILED DESCRIPTION OF PREFERRED EMBODIMENTS

The detailed description that follows is intended to provide specific examples of particular embodiments illustrating various ways of implementing the claimed subject matter. It is written to take into account the level of knowledge of one of ordinary skill in the art to which the claimed subject matter pertains. Accordingly, certain details may be omitted as being unnecessary for enabling such a person to realize the described embodiments. In addition, references to directions, such as "top," "bottom," "left" and "right" in the description that follows refer solely to orientations as depicted in the drawings and in which the steam trap and other components will normally occupy in use, such terms do not limit the steam trap to being used in other orientations or to having its component parts oriented differently from their depiction in the drawings. In addition, fluid flow conduits, passages, bores, etc., referred to herein have circular cross-sections unless it is otherwise stated in the description or shown in the drawings, or the context suggests a different configuration.

Steam Trap Construction

Figure 3:
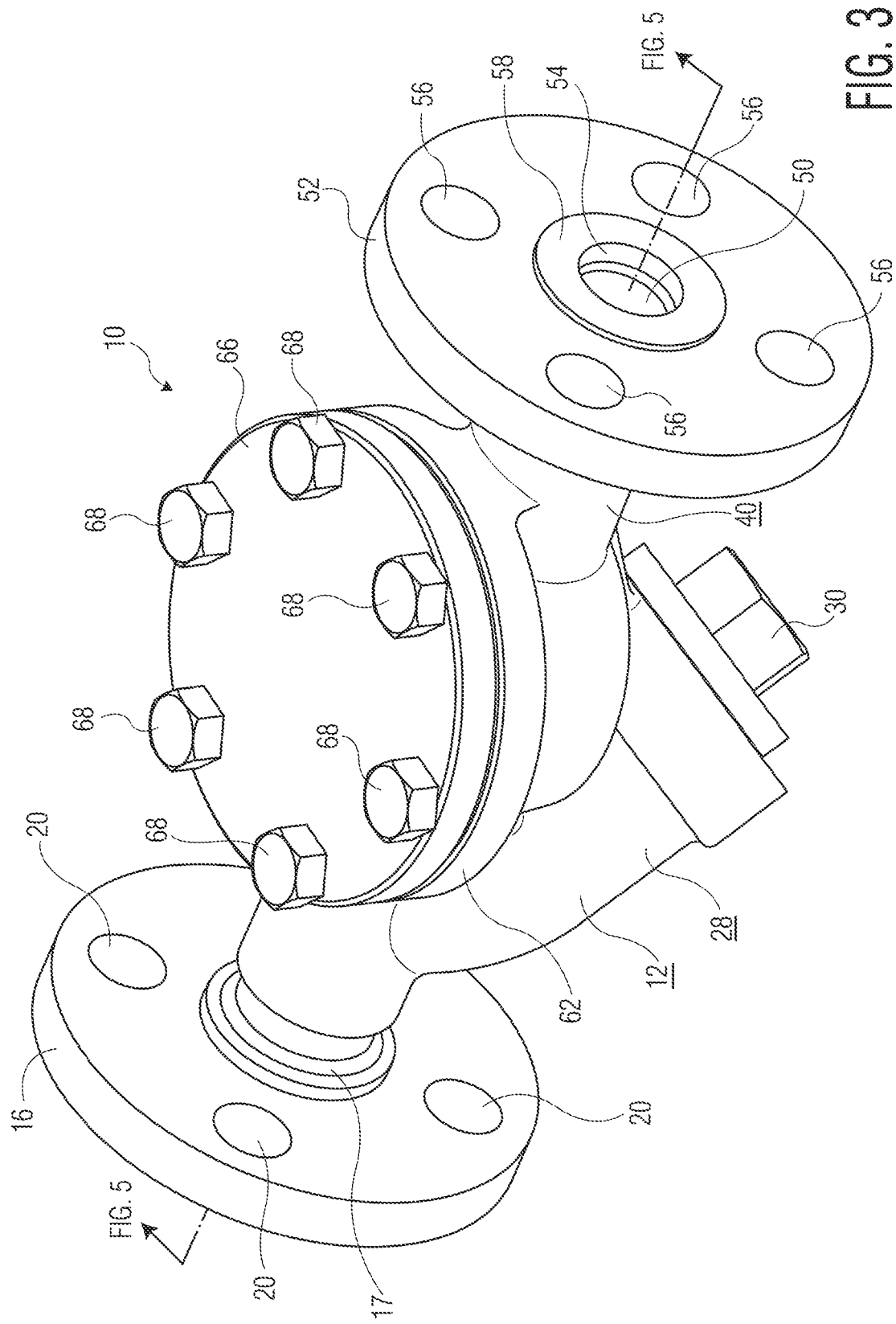
FIG. 3 is an isometric view of a steam trap in accordance with one embodiment of the subject matter claimed herein.
Figure 4:
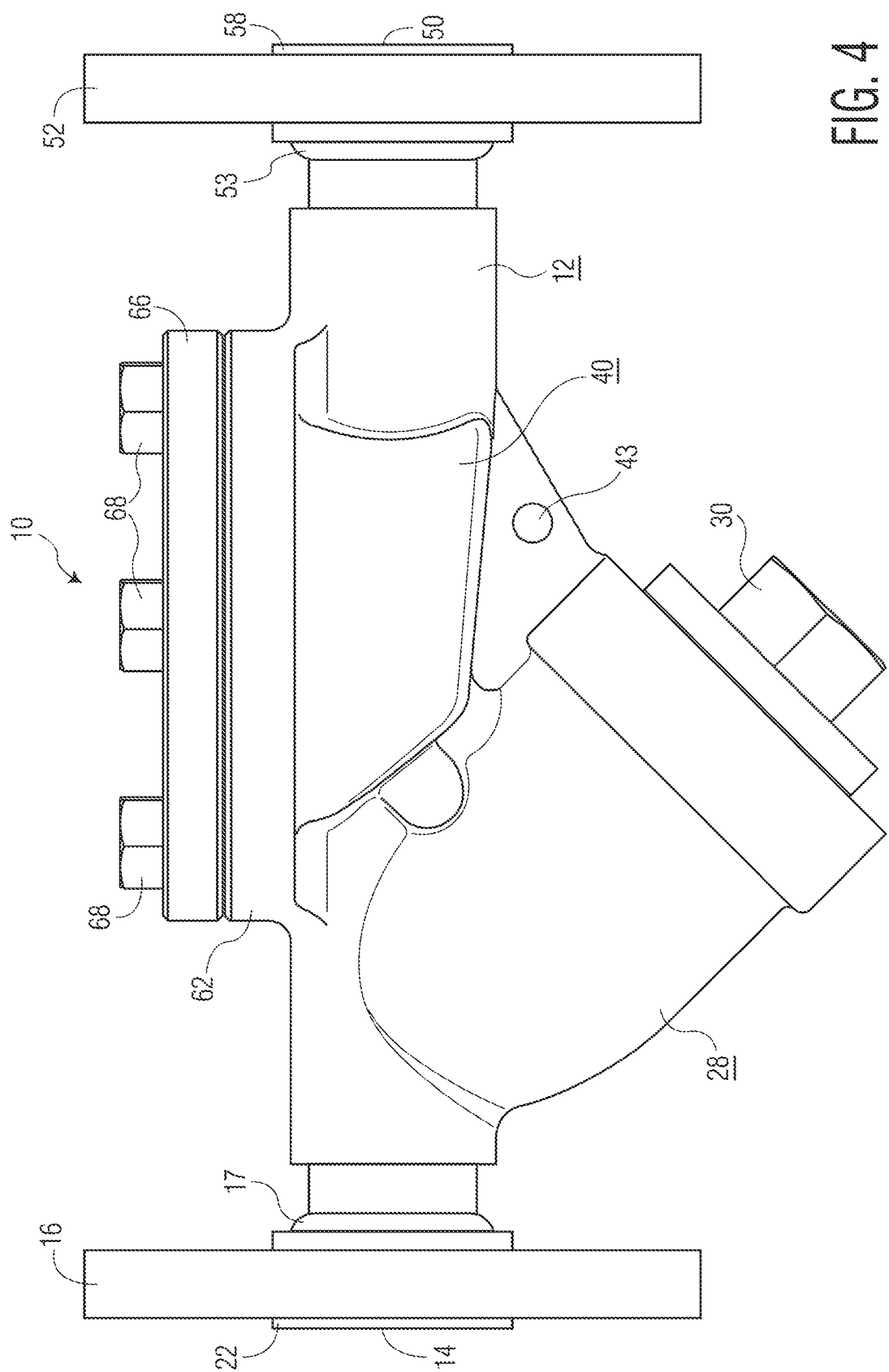
FIG. 4 is side elevational view of the steam trap shown in FIG. 3.
Figure 5:
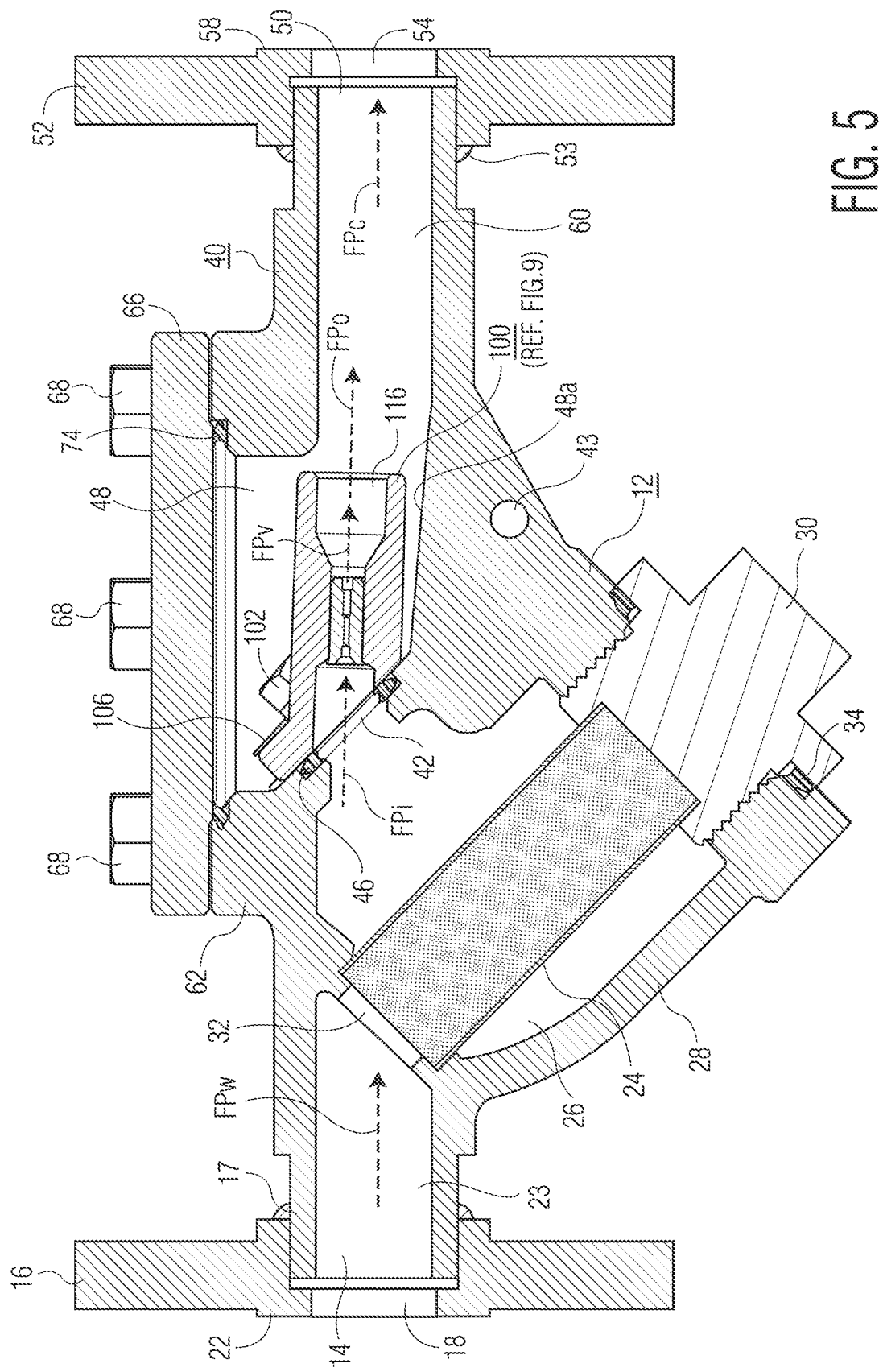
FIG. 5 is a cross-sectional view of the steam trap shown in FIGS. 3 and 4 taken along the line FIG. 5-FIG. 5 in FIG. 3 in the direction of the arrows.

The venturi steam trap 10 depicted in the accompanying drawings addresses shortcomings of known steam traps discussed above. Referring first to FIGS. 3-5, the steam trap 10 comprises a steam trap body 12, preferably cast in one piece from a stainless steel alloy chosen for its corrosion resistance, such as ASTM A351 CF8M. However, other materials and methods of manufacturing can be used depending on factors such as the composition of the working fluid and a desired pressure and temperature rating. In the present embodiment the steam trap body 12 is installed in a process line of an apparatus that uses steam as a working fluid, at a location in the line where the working fluid includes a liquid fraction (water) and a gaseous fraction (steam). Typical apparatus requiring steam traps include building heating systems, heat exchangers in commercial laundries, systems using steam turbines to drive machinery such as terrestrial and shipboard power generating equipment, and many others. Steam traps enhance the efficiency and enable proper operation of such installations by separating liquid water in the two-phase working fluid for discharge as condensate and retaining gaseous steam.

The steam trap body 12 includes a trap inlet 14 to which an inlet flange 16 is attached by a suitable method such as a filet weld 17. The flange 16 includes a central opening 18 for the process fluid and four equally-circumferentially spaced through-holes 20, only three of which are visible in FIG. 3. The holes 20 accept bolts (not shown) for securing the inlet flange 16 to a cooperating flange on the process line (not shown). A raised land 22 on the face of the flange 16 is machined flat to a close tolerance for cooperating with a like flat on a flange or similar structure on the process line for compressing between them a suitably rated gasket that will provide a fluid tight seal with the process line at the elevated temperatures and pressures of the working fluid. In most installations the flange on the process line is a close mirror image of the flange 16.

Referring to FIG. 5, the steam trap body forms an internal flow path, generally depicted in the drawings by a dashed line. An inlet passage 23 forms a working fluid inlet portion FPw of the flow path that directs the working fluid from the trap inlet 14 to the interior of a strainer 24 in a strainer compartment 26 formed in a strainer portion 28 of the trap body 12. The strainer 24 comprises a cylindrical stainless steel screen, typically of a standard no. 40 mesh, for straining particulate matter from the working fluid that could clog the trap's venturi nozzle (described below). A cap 30 screws into a threaded opening at the bottom of the strainer compartment 26 to hold the strainer against a shoulder formed at the circular inlet opening 32 at the top of the compartment. A conventional spiral-wound/graphite gasket 34, with specifications appropriate to the operating conditions for which the steam trap is rated, seals the bottom of the strainer compartment 26. In a typical installation the cap 30 includes a valve (not shown) that can be periodically opened to expel accumulated particulates from the strainer compartment by venting the high pressure working fluid in the strainer compartment.

The steam trap 10 further includes a condensate removal portion 40 in fluid communication with the strainer portion 28 via a working fluid outlet 42 in the strainer compartment 26. An optional small opening 43 formed through a reinforcing web cast between the two portions 28 and 40 allows a user to attach a metal tag or the like with a bar code or other indicia indicating the steam trap model number, its location or other information that may be useful to the operator of the installation incorporating the steam trap. A suitable gasket 46 seals the strainer compartment outlet 42 to the inlet of a replaceable condensate-removal nozzle cartridge assembly 100. The structure and operation of the assembly 100 (variously referred to herein as the nozzle cartridge, replaceable nozzle cartridge, nozzle cartridge assembly or the like) are described in detail further below with reference to FIGS. 6-11. The working fluid passes through the outlet 42 into a venturi inlet portion FPi of the nozzle cartridge assembly 100 flow path (see FIG. 9). The flow path further includes a venturi outlet portion FPo that directs extracted condensate into a discharge chamber 48 in the condensate removal portion 40.

The steam trap body 12 includes a trap outlet 50 to which an outlet flange 52 is attached by a suitable method such as such as a filet weld 53. The structure of the trap outlet and flange mirrors that of the trap inlet 14 and the flange 16 described above. Both flanges are preferably made of the same material as the steam trap body to avoid differential thermal expansion issues. In that respect, the flange 52 includes a central opening 54 for the condensate and through holes 56 that accept bolts for securing the flange 52 to a cooperating flange on a condensate discharge line (not shown). A raised land 58 on the face of the flange 52 serves the same function vis-à-vis the condensate discharge line as the raised land 22 on the flange 16 vis-à-vis the process line. In most applications, the outlet flange 52 on the condensate discharge line closely mirrors the flange on the process line. The internal flow path through the steam trap includes a condensate discharge portion FPc formed by a condensate discharge conduit 60 from the discharge chamber 48 to the trap outlet 50.

The steam trap body 12 is formed with a boss 62 surrounding the discharge chamber 48 and forming an opening 64 into the discharge chamber 48 providing access to the replaceable condensate-removal cartridge assembly 100. (See FIGS. 6 and 7.) A removable cover 66 is held in place by bolts 68 that pass through clearance holes (not shown) in the cover and thread into tapped blind holes 72 in the steam trap body. The interior periphery of the boss comprises a machined countersink 74 forming a recess that accepts a gasket 76 suitable to the purpose that is compressed between the surfaces of the countersink and the underside of the cover 66 by tightening the bolts 68 to seal the access opening 64. In most instances the cover 66 will be made of the same material as the steam trap body 12, or at least a material with a similar coefficient of thermal expansion.

The structure described thus far and depicted in the drawings represents one preferred form of the steam trap that is the subject of this disclosure. However, alternate constructions will operate equally as well for the purposes described herein. For example, in the embodiment discussed above the strainer portion and the condensate removal portions are integrally cast as a single unit, but they can also be separately formed and connected together in similar fashion to that shown in U.S. Pat. No. 4,426,213 discussed above. In addition, certain users prefer connecting steam traps into their steam systems by directly welding them in situ to the installation's process lines. Others will prefer to provide make threaded connections with cooperating threads (either internal or external) on the inlet and outlet of the steam trap body. These different constructions, and others, can be employed in the steam trap embodiments described here within the scope of the present disclosure and appended claims.

Replaceable Condensate-Removal Nozzle Cartridge with Venturi Through Passage

Figure 6:
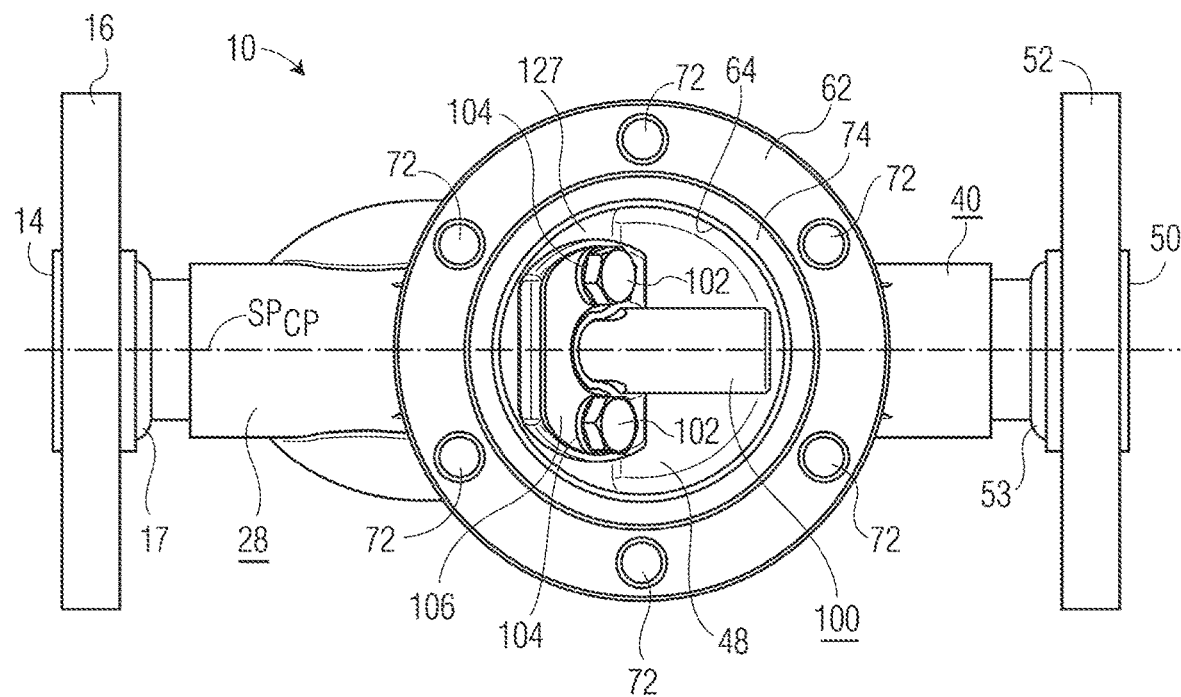
FIG. 6 is a top view of the steam trap shown in FIGS. 3 and 4 with the top access cover removed to show a replaceable condensate-removal nozzle cartridge forming a part of the flow path through the steam trap.
Figure 7:
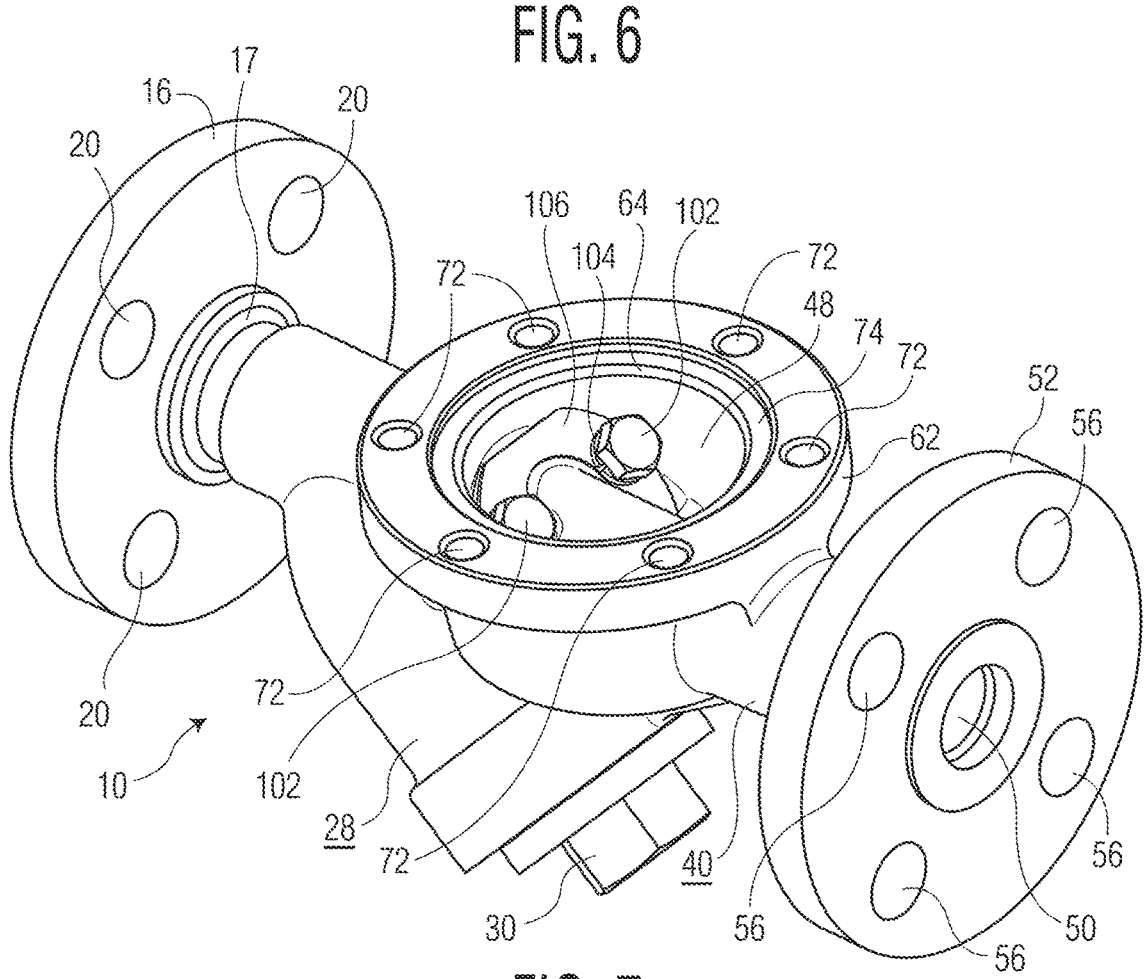
FIG. 7 is an isometric view of the steam trap as shown in FIG. 6.
Figure 8:
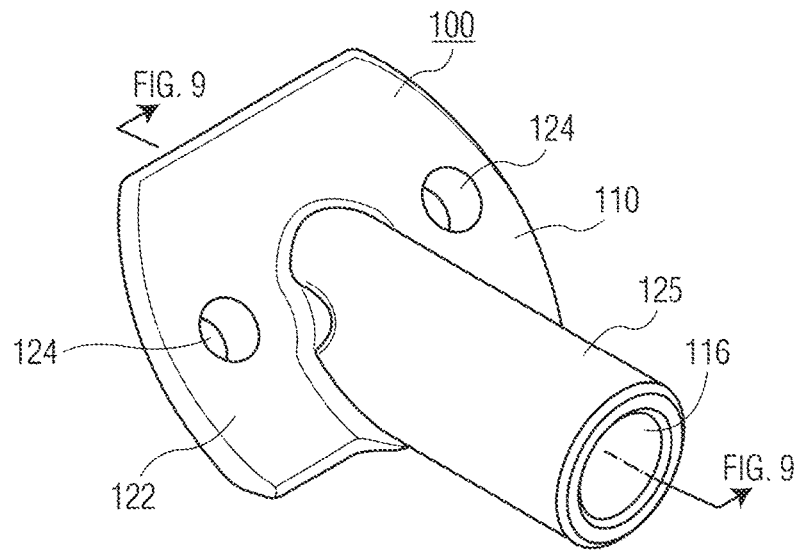
FIG. 8 is an isometric view of the replaceable nozzle cartridge shown in FIGS. 5-7.

FIGS. 6 and 7 illustrate the location and orientation of the replaceable condensate-removal nozzle cartridge assembly 100 in the steam trap body 12, and more particularly in the steam trap's condensate removal portion 40. FIG. 6 is a view from the top of the steam trap (as seen FIGS. 3-5) with the cover 66 removed and FIG. 7 is an isometric view of the configuration shown in FIG. 6 which more clearly illustrates the position and orientation of the cartridge assembly within the discharge chamber 48. The cartridge assembly 100 is held in place in the discharge chamber 48 by bolts 102 screwed into tapped blind holes (not shown) in the steam trap body 12. The bolts compress a nozzle cartridge mounting surface against the sealing gasket 46 (see FIGS. 5 and 9)

to form a fluid-tight seal between the nozzle cartridge assembly and the trap body in a manner described just below. Conventional lock washers 104 are preferably used to ensure that the nozzle cartridge assembly remains secured to the trap body under operational conditions that can include wide temperature variations and intense vibrations. The nozzle cartridge assembly 100 is shown with an optional ID plate 106 carrying identifying indicia such as a nozzle cartridge model number. This adds utility particularly because one of the features of the steam trap 10 is the ability to interchange nozzle cartridges, and the ID tag can be employed to provide immediate visual confirmation that a nozzle cartridge with the desired operational specifications is being used.

Constructional details of the nozzle cartridge assembly 100 will be more completely understood by reference to FIGS. 8-11. Beginning with FIGS. 8 and 9, the nozzle cartridge 100 in the present embodiment includes a nozzle holder 110 that forms a through passage 112 between a nozzle inlet 114 and a nozzle outlet 116. In the present embodiment the through passage 112 is formed by a separate venturi nozzle insert 120 press-fit into the nozzle holder as described below with further reference to FIGS. 10 and 11. The nozzle holder 110 is a one-piece casting, preferably of the same material as the steam trap body 12 to prevent differential thermal expansion at elevated operating temperatures. The nozzle holder 110 includes a mounting portion 122 with through-holes 124 for passage of the bolts 102 into the trap body. (The ID plate 106, omitted from FIGS. 8 and 9 for clarity, has complementary through-holes.) The nozzle holder further includes a tubular nozzle insert mount 125 that is cast integrally with the mounting portion 122 and has a bore that is sized to hold the nozzle insert 120 as described in the next paragraph. The mounting portion 122 includes a face 126 machined to an appropriate flatness specification for cooperating with a similarly machined flat surface 127 on the steam trap body 12 (shown in phantom in FIG. 9). The bolts 102 hold the machined face 126, comprising the nozzle cartridge mounting surface referred to previously, flush with the cooperating flat mounting face 127 on the trap body (also referenced in FIG. 6), as discussed above.

Figure 9:
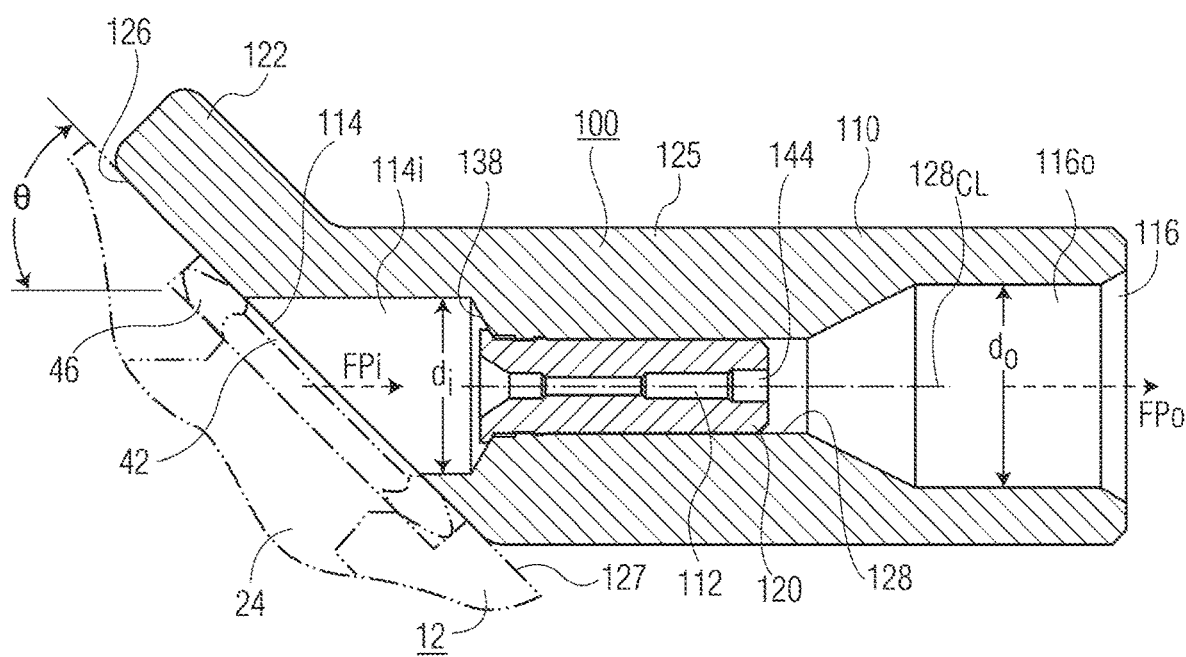
FIG. 9 is an enlarged cross-sectional view of the replaceable nozzle cartridge shown in FIG. 8 taken along the line FIG. 9-FIG. 9 in FIG. 8.
Figure 10:
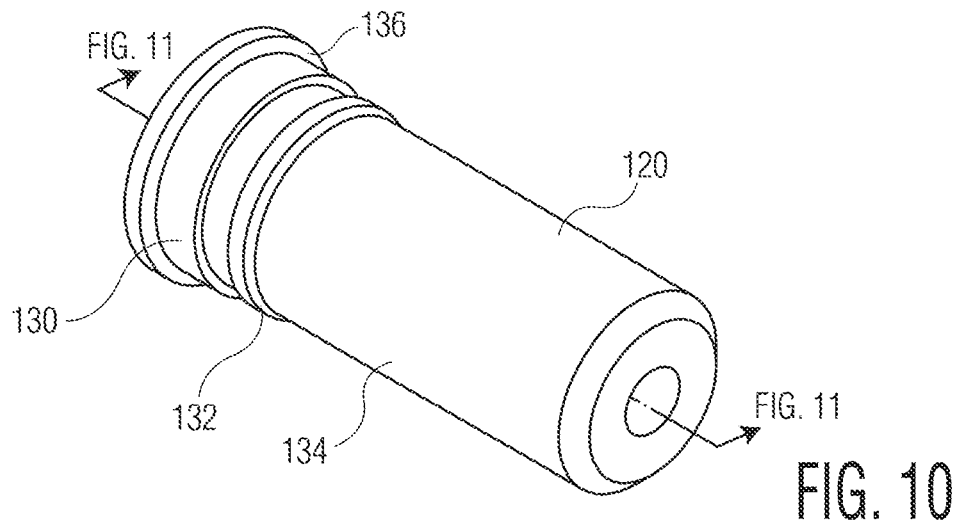
FIG. 10 is an isometric view of the nozzle insert forming the venturi nozzle in the through passage of the nozzle cartridge shown in FIGS. 5-9.
Figure 11:
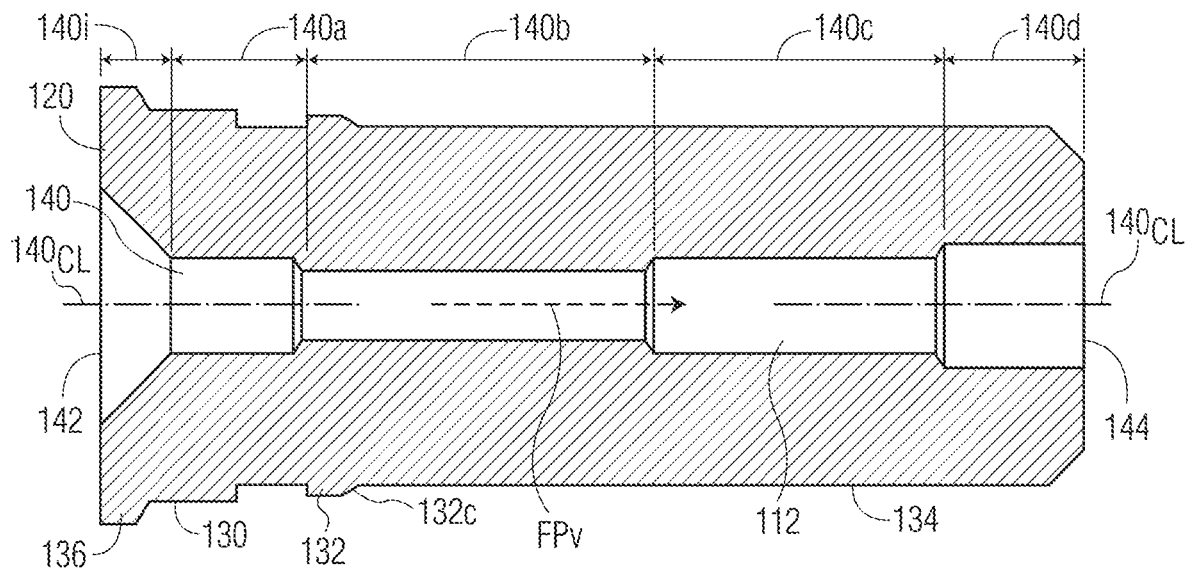
FIG. 11 is a cross-sectional view of the nozzle insert taken along the line FIG. 11-FIG. 11 in FIG. 10 in the direction of the arrows.

Referring now to FIGS. 10 and 11, the venturi nozzle insert 120 comprises a circular cylindrical casting having a cylindrical outer surface with regions machined to close tolerances that cooperate with a circular nozzle holder bore 128 in the nozzle insert mount 125 of the nozzle holder 110. The bore 128 is likewise machined to close tolerances to provide a slight interference fit with the nozzle insert 120. In the present embodiment the nozzle insert includes first and second interference bands 130 and 132 with close roundness and diametrical tolerances matched to like tolerances in the bore 128 to hold the insert firmly in the bore when the insert is press-fit into place. (The tolerances are controlled so that the nozzle insert 120 can be removed from the bore 128 for replacement or substitution of a different insert.) A chamfered flange 136 at the inlet end of the nozzle insert bears against a tapered face 138 (see FIG. 9) at the inlet of the nozzle holder bore 128 to fix the axial position of the nozzle insert within the nozzle holder 110. The diameter of the nozzle insert region 134 from the second interference band 132 to the right-hand end of the nozzle insert (as seen in FIG. 11) can be a slight clearance fit with the bore 128 to facilitate insertion of the nozzle insert from the left-hand end of the bore (as seen in FIG. 9). The leading edge of the interference band 132 is chamfered at 132c to facilitate the forced entry of the insert into the bore 128. The mounting can be made more secure by using an insert of a material with a higher coefficient of thermal expansion than the nozzle holder. In addition, the inside of the bore can be contoured to accept the interference band 132 in a manner that locks the insert more firmly in place in the axial direction in the nozzle holder.

The nozzle insert 120 has a circular central bore 140 that forms the through passage 112 in the present embodiment. In preferred embodiments the nozzle holder's outer surface geometry holds it in the nozzle holder with the centerline $140_{CL}$ of the nozzle insert bore 140 coincident with the centerline $128_{CL}$ of the nozzle holder bore 128. Preferred embodiments of the nozzle holder are also constructed so that the centerlines of the nozzle holder inlet throat 114i and the nozzle holder outlet passage 116o coincide with each other and with the centerline $128_{CL}$. The steam body mounting face 127 in the depicted embodiment presents a planar surface normal to a vertical plane through the steam trap (that is, the plane of the drawing in FIG. 9), but tilted upwardly at an angle θ relative to the centerline $128_{CL}$ of the nozzle holder bore 128. The nozzle cartridge mounting surface 126 is likewise a planar surface angled at θ° relative to the centerline $128_{CL}$ of the nozzle holder bore, which tilts the bolts 102 upwardly and enables them to be more easily engaged by an appropriate tool to remove the condensate-removal nozzle cartridge 100 for inspection and/or replacement. The angle θ is preferably about 45°, but in preferred embodiments can be any value between about 30° up to 90° depending on the configuration and dimensions of the discharge chamber 48.

Steam Trap Operation and Maintenance

In operation the steam trap 10 is connected between an apparatus process line attached to the inlet flange 16 and a condensate discharge line attached to the outlet flange 52. Steam traps are incorporated in apparatus process lines at locations where the working fluid is expected to include both a gaseous fraction (steam) and a liquid fraction (condensate). The working fluid enters the steam trap via the working fluid inlet portion FPw of the steam trap flow path and passes through the strainer 24 to remove particulates that could clog the through passage 112. The working fluid exits the strainer compartment via the inlet flow path portion FPi through the nozzle holder inlet throat 114i of the nozzle cartridge 100. The working fluid enters the nozzle insert bore 140 at an inlet 142 and flows in the straight-line venturi flow path portion FPv to an outlet 144 of the nozzle insert bore.

In the present embodiment the through passage 112 in the nozzle insert bore 140 is configured with five regions, denoted in order in FIG. 11 with references 140i, 140a, 140b, 140c and 140d, that together form the venturi flow path portion FPv. The region 140i provides a smooth transition from the bore inlet 142 to the first region 140a. The diameters of the regions 140a-140d are sized to vary the pressure of the working fluid flow such that it decreases from the first region 140a to the second region 140b; then increases as it enters the third region 140c from the region 140b; and finally increases again as it enters the fourth region 140d. The through passage 112 thus functions as a venturi nozzle in a conventional fashion, whereby the pressure reduction from the larger diameter region 140a to the smaller diameter region 140b causes a portion of the hot liquid fraction in the working fluid to re-evaporate ("flash"). As already described, this inhibits passage of the gaseous steam fraction of the working fluid through the nozzle, while the remaining liquid fraction is extracted as condensate. The actual lengths and diameters of the various regions of the venturi flow path, and the number and profiles of different regions, depend on installation operating conditions such as the pressure and flow rates for which the steam trap is rated. As discussed, an important consideration in designing the nozzle bore is matching as closely as possible the pressure in the working fluid process line (i.e., at the steam trap inlet) with the pressure at the nozzle bore inlet in accordance with steam trap design specifications. The manner of determining the required flow characteristics of the nozzle bore to this purpose will be well understood by those skilled in the art of venturi steam trap construction and design.

Referring now also to FIG. 9, the extracted condensate exits the bore outlet 144, which exits to a portion of the nozzle holder bore 128 that diverges to the larger diameter nozzle holder outlet passage 116o. The extracted condensate exits the nozzle holder 110 through the nozzle outlet 116 in the direction of the venturi outlet portion FPo of the flow path into the discharge chamber 48, as seen in FIG. 5. The condensate discharge conduit 60 connects the discharge chamber to the steam trap outlet 50 through the steam trap condensate discharge portion FPc of the flow path from the discharge chamber 48 to the trap outlet 50. The construction of the steam trap 10 also permits the bottom of the discharge chamber 48 to have a slight downward pitch 48a in the neighborhood of 2%-5% to assist drainage of the extracted condensate from the discharge chamber 48 and through the outlet 50 when the apparatus in which it is installed is shut down. This can be important in certain installations an example being a pharmaceutical application where any bacteria or other contamination in working fluid remaining in the steam trap can have serious consequences.

An important feature of the steam trap 10 is the construction that locates the nozzle cartridge 100, and more particularly the nozzle outlet 116, in a reduced pressure region provided by the discharge chamber 48 on the low pressure side of the venturi passage. That is, in a typical implementation the working fluid in the venturi inlet portion FPi of the flow path can be as high as 2,000 psig, while being substantially lower in the discharge chamber. As a result, the cover 66 and the bolts 68 securing it place are not subject to the high pressure of the working fluid entering the steam trap, like the access cap AC and the cap threads CT in the Delta-type steam trap SP in FIGS. 1 and 2. In addition, this construction enables the steam trap to be designed to accommodate the pressure in the discharge chamber for any application by using more or fewer bolts 68 and a cover 66 designed accordingly. This permits the steam trap 10 to be rated for safe operation at pressures and temperatures in excess of those to which the steam trap SP can be subjected. When the cover 66 is off, the nozzle cartridge 100 can be removed by unscrewing the bolts 102 holding it in place. The nozzle cartridge assembly 100 can be replaced in its entirety, or only the nozzle holder 110, or a new nozzle insert can be installed in the nozzle holder and the assembly reinstalled. The same construction permits the discharge chamber 48 to be made large enough to provide sufficient room to permit access to the bolts 102 with a tool and to grasp and extract the nozzle cartridge from the chamber 48.

A particular advantage of this construction is that it provides access to the venturi nozzle without removing the steam trap from the installation process line, thus preserving that aspect of the prior steam trap SP, without limiting the steam trap's pressure and temperature rating as in that type of prior art construction. At the same time, the unique configuration of the steam trap 10 retains the operational advantages of the commercially successful STEAMGARD™ steam traps with straight-line flow paths like that shown in U.S. Pat. No. 4,426,213. As seen in FIG. 5 especially, the flow path through the steam trap comprising the various flow path portions FPw, FPi, FPv and FPo are all in the same straight-line direction, as defined by the circular working fluid inlet passage 23, the nozzle holder inlet throat 114i, nozzle insert bore 140, the nozzle holder outlet passage 116o and the condensate discharge conduit 60. The centerlines of these passages, and the condensate discharge conduit 60, also lie along the same straight line represented by the edge of a plane SPcp shown in FIG. 6 containing the centerlines of all of those fluid passages. This construction avoids the multiple drastic changes in flow direction shown in FIG. 2 and the accompanying operational disadvantages resulting from the configuration of the steam trap SP required to provide access to the venturi nozzle VN.

Those skilled in the art will understand that the term "straight-line direction," used to describe the flow path orientation in which the flow path portions FPw and FPi are substantially parallel, nevertheless allows for turns and diversions in the flow from the steam trap inlet 14 to the nozzle bore inlet 142, provided that the process line and venturi inlet pressures can be sufficiently matched by applying known steam trap design techniques. For example, in typical constructions of the steam trap body 12 the centerlines of the inlet passage 23 and the nozzle bore 140 will be parallel but offset vertically (as seen in FIG. 5), with an unobstructed line connecting the centers of the strainer compartment inlet opening 32 and the nozzle bore inlet 142 forming an angle no greater than 10° from horizontal. The inlet passage typically leads directly to the strainer compartment inlet opening 32, but the flow path portion FPw between them can also deviate from a straight line by up to 10° depending on the installation. In other embodiments the flow paths FPw and FPi may be non-parallel, with changes in the flow direction from the trap inlet 14 to the nozzle bore inlet 142 up to 40° or more being acceptable depending on the operating conditions and installation geometry. The slight offset in the flow direction portions FPo and FPc depicted in FIG. 5 will not have a significant effect on steam trap performance, with a wide variety of configurations in this respect being possible to accommodate different installation geometries. However, the centerlines of the condensate discharge portion FPc portion and the working fluid inlet portion FPw will usually coincide with each other and with the usually coincident centerlines of the installation process line and condensate discharge line.

Additional Features and Alternate Embodiments

Figure 12:
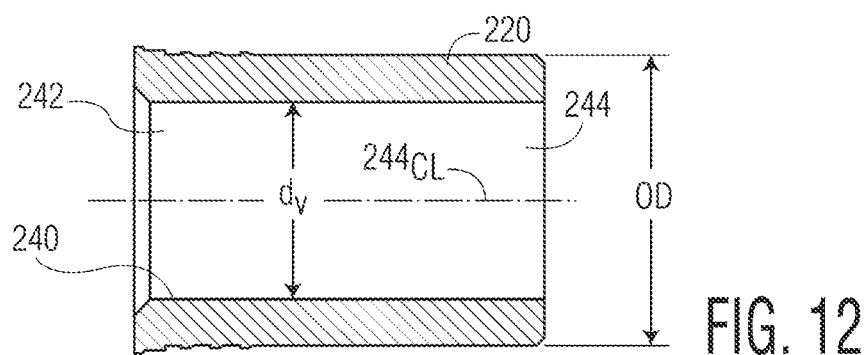
FIG. 12 is a cross-sectional view of an alternate embodiment of the nozzle insert shown in FIGS. 10 and 11.

The steam trap 10 also improves on an important feature of constructions like that in U.S. Pat. No. 4,426,213, in which removable venturi nozzle structures (ref. no. 34) permit the use of different venturi nozzles with different operational characteristics in the same steam trap body. Since the removable nozzle structure in the steam trap 10 of the present disclosure is held in a bore in the steam trap body, nozzle structures with different outside diameters that provide different operational characteristics cannot be used in the same steam trap. However, the combination replaceable nozzle cartridge 100 and separate venturi nozzle insert 120 used in the steam trap 10 provide additional flexibility by enabling the use of venturi nozzles with different outside diameters in the same size steam trap body. FIG. 12 depicts an alternate embodiment 220 of the nozzle insert 120 illustrating this feature.

A single model steam trap body may be rated for different flow characteristics (temperature, pressure, flow rate, etc.), which will require different venturi nozzle specifications. A typical nozzle insert 120 like that depicted in FIG. 11 may have a bore 140 sized for particular flow rates and an outside diameter that fits a nozzle holder bore 128 having a nominal diameter suitable to the purpose. However, higher flow rates may require a nozzle insert with a larger bore 240 and a correspondingly larger outside diameter OD. Nevertheless, a particular size steam trap model can be used with either nozzle insert 120 or 220 by providing different nozzle holders, both of which are constructed for use with the same size steam trap body 12. This provides a user with greater flexibility in deploying steam traps throughout an installation and reducing overall manufacturing costs by reducing the number of different steam trap bodies needed to meet different operational specifications.

The configuration of the nozzle holder shown in FIG. 9 makes it possible to use a nozzle insert 220 like that depicted in FIG. 12, having a uniform diameter from its inlet 242 to its outlet 244. In that regard, the nozzle holder inlet throat 114$i$, the bore 240 and the nozzle holder outlet passage 116$o$ are sized as described above to comprise the through passage of the steam trap, whereby the pressure reduction from the larger diameter $d_i$ of the inlet throat 114$i$ to the smaller diameter $d_v$ of the bore 244 causes a portion of the hot liquid fraction in the working fluid to re-evaporate ("flash") so that passage of the gaseous steam fraction of the working fluid is restricted, as described above. The outlet passage 116$o$ has a diameter $d_o$ such that the extracted condensate exits into the discharge chamber 48 at a reduced pressure as before.

This provides the steam trap designer with a wide variety of options. For example, different nozzle holders 110 with identical mounting portions 122 but different size nozzle insert mounts 125 can be used with the same steam trap body design in accordance with the operating conditions of the target installation. Likewise, nozzle holders with mounting portions 122 having different dimensions that match different steam trap designs can be made with nozzle insert mounts 125 that fit identical nozzle inserts. This kind of versatility is unique to the replaceable nozzle cartridge 100 comprising a nozzle holder and separate nozzle inert as described here.

SUMMARY AND CONCLUSION

Figure 2:
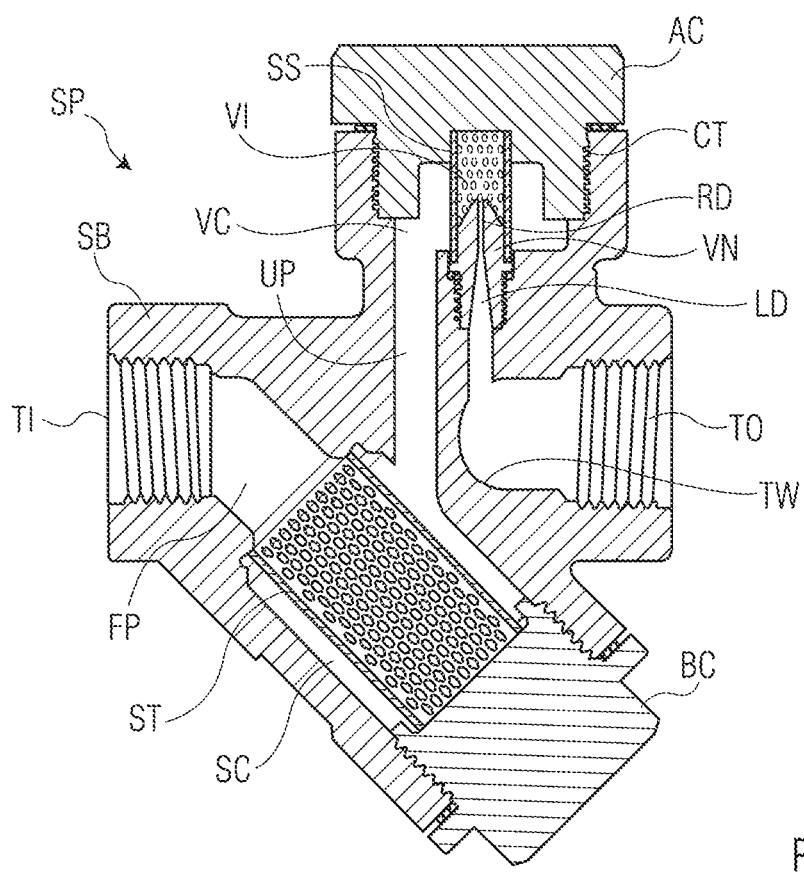
FIG. 2 is a cross-sectional view taken through the steam trap SP shown in FIG. 1 in the plane of the drawing.

A steam trap constructed in accordance with the above description provides numerous advantages over previously known venturi-type steam traps in which the venturi nozzle can be replaced without removing the steam trap from the process line, such as the trap shown in FIGS. 1 and 2. A serious shortcoming of that design is the difficulty of matching steam trap flow characteristics with those of the working fluid in the process line, which is important for avoiding the retention of excess condensate in the process line that can degrade the thermal efficiency of the installation and cause system damage from phenomena such as water hammer. A steam trap with the construction disclosed here also enables replacement of the venturi nozzle while leaving the process line intact, but in addition enables the trap to be more readily designed to match steam trap/process line flow characteristics to minimize steam loss and maximize condensate removal.

Moreover, the combination replaceable venturi nozzle insert with its replaceable enables the steam trap to be adapted to various operational conditions by making it possible to use the same nozzle holder to provide the replaceable nozzle cartridge. Likewise, it enables the same venturi nozzle insert to be used with different nozzle holders. This gives a steam trap manufacturer more flexibility in meeting users' specifications with fewer steam trap body styles, thus reducing overall manufacturing costs.

Those skilled in the art will further understand that the steam trap 10 described here as applied to systems in which the working fluid is steam, also has applicability in any system in which a liquid fraction of other types of working fluids is removed as condensate while retaining its gaseous fraction.

Finally, those skilled in the art will readily recognize that only selected preferred embodiments of the invention have been depicted and described, and it will be understood that various changes and modifications can be made other than those specifically mentioned above without departing from the spirit and scope of the invention, which is defined solely by the claims that follow.

What is claimed is:

1. A steam trap for removing condensate from a process line of an apparatus carrying a working fluid including steam used by the apparatus, the steam trap comprising a steam trap body having an internal flow path from a trap inlet to a trap outlet, said trap inlet being constructed for introducing working fluid to said internal flow path from the process line at an operating temperature and pressure causing the working fluid to include a liquid fraction and a gaseous fraction during operation of the apparatus, wherein:

said steam trap includes a venturi nozzle comprising a single, straight-line venturi flow path portion that forms the only venturi nozzle in said internal flow path between said trap inlet and said trap outlet, said straight-line venturi flow path portion being configured to reduce the pressure of working fluid in said internal flow path by an amount sufficient to cause at least a portion of the liquid fraction thereof to convert to a gaseous phase and at least partially restrict flow of the gaseous fraction through said straight-line venturi flow path portion while discharging as condensate another portion of the liquid fraction at a pressure less than the operating pressure;

said straight-line venturi flow path portion is formed by a through passage in a condensate nozzle secured to said steam trap body and having a nozzle inlet in fluid communication with said trap inlet for introducing said process fluid therein to said through passage and a nozzle outlet for discharging said condensate from said through passage into a reduced pressure region of said internal flow path forming a discharge chamber in fluid communication with said trap outlet for discharging from said steam trap body condensate discharged from said nozzle outlet;

said condensate nozzle comprises a nozzle cartridge assembly including a nozzle holder and a separate nozzle insert secured in said nozzle holder;

said discharge chamber has an access opening sealed by a removable cover to provide access to said condensate nozzle; and said nozzle holder is removably secured to said steam trap body by removable fasteners with said nozzle inlet sealed to an inlet of said discharge chamber and said nozzle holder disposed in said discharge chamber, said fasteners being accessible for removing said nozzle cartridge assembly from said steam trap via said access opening when said cover is removed.

2. The steam trap in claim 1, wherein said nozzle insert forms at least a part of said through passage and has a cross-sectional area varying in the direction of fluid flow for varying the pressure of the working fluid passing therethrough.

3. The steam trap in claim 2, wherein said nozzle insert is removably secured in a bore of said nozzle holder.

4. The steam trap in claim 1, wherein:
said nozzle insert has a cross-sectional area substantially constant in the direction of fluid flow; and
said nozzle holder and said nozzle insert comprise said through passage having a cross-sectional area for varying the pressure of the working fluid passing through said nozzle cartridge assembly.

5. The steam trap in claim 4, wherein said nozzle holder and said nozzle insert have circular cross-sections with coincident centerlines, said nozzle insert having a smaller diameter than said nozzle holder for reducing the pressure of the working fluid by an amount sufficient to cause at least a portion of the liquid fraction thereof to convert to a gaseous phase and at least partially restrict flow of the gaseous fraction through said nozzle insert.

6. A condensate removal trap for removing condensate from a process line of an apparatus carrying a working fluid used by the apparatus, the condensate removal trap comprising a trap body having an internal flow path from a trap inlet to a trap outlet, said trap inlet being constructed for introducing working fluid to said internal flow path from the process line at an operating temperature and pressure causing the working fluid to include a liquid fraction and a gaseous fraction during operation of the apparatus, wherein:
said trap includes a venturi nozzle comprising a single, straight-line venturi flow path portion that forms the only venturi nozzle in said internal flow path between said trap inlet and said trap outlet, said straight-line venturi flow path portion being configured to reduce the pressure of working fluid in said internal flow path by an amount sufficient to cause at least a portion of the liquid fraction thereof to convert to a gaseous phase and at least partially restrict flow of the gaseous fraction through said straight-line venturi flow path portion while discharging as condensate another portion of the liquid fraction at a pressure less than the operating pressure;
said straight-line venturi flow path portion is formed by a through passage in a condensate nozzle secured to said trap body and having a nozzle inlet in fluid communication with said trap inlet for introducing said process fluid therein to said through passage and a nozzle outlet for discharging said condensate from said through passage into a reduced pressure region of said internal flow path forming a discharge chamber in fluid communication with said trap outlet for discharging from said trap body condensate discharged from said nozzle outlet;
said condensate nozzle comprises a nozzle cartridge assembly including a nozzle holder and a separate nozzle insert secured in said nozzle holder;
said discharge chamber has an access opening sealed by a removable cover to provide access to said condensate nozzle; and
said nozzle holder is removably secured to said trap body by removable fasteners with said nozzle inlet sealed to an inlet of said discharge chamber and said nozzle holder disposed in said discharge chamber, said fasteners being accessible for removing said nozzle cartridge assembly from said condensate removal trap via said access opening when said cover is removed.

7. The condensate removal trap in claim 6, wherein said nozzle insert is removably secured in a bore of said nozzle holder.

8. A steam trap for removing condensate from a process line of an apparatus carrying a working fluid including steam used by the apparatus, the steam trap comprising (i) a steam trap body providing an internal flow path between a trap inlet constructed for attachment to the process line of the apparatus and a trap outlet, and (ii) a condensate nozzle including a replaceable venturi nozzle cartridge with a nozzle holder and a separate nozzle insert in a nozzle holder bore through said nozzle holder, wherein:
said nozzle holder includes a nozzle holder inlet in fluid communication with said trap inlet via an inlet passage forming a working fluid inlet portion of said internal flow path for introducing to the nozzle holder inlet working fluid from the process line of the apparatus at an operating temperature and pressure causing the working fluid to include a liquid fraction and a gaseous fraction;
said nozzle insert comprises a nozzle insert bore forming a single, straight-line venturi flow path portion in said internal flow path between said trap inlet and said trap outlet, said venturi flow path portion being configured to reduce the pressure of working fluid introduced to said nozzle holder inlet by an amount sufficient to cause at least a portion of the liquid fraction thereof to convert to a gaseous phase and at least partially restrict flow of the gaseous fraction through said nozzle insert bore while discharging another portion of the liquid fraction from an outlet of said nozzle insert bore at a pressure less than the operating pressure as condensate into a reduced pressure region of said steam trap body forming a discharge chamber in fluid communication with said trap outlet for discharging from said steam trap body condensate discharged from said outlet of said nozzle insert bore; and
said discharge chamber has an access opening sealed by a removable cover and said nozzle holder is removably secured in place in said steam trap body by bolts, with said nozzle holder inlet being sealed to an inlet of said discharge chamber in fluid communication with said trap inlet and said bolts being accessible for removal of said replaceable venturi nozzle cartridge from said steam trap via said access opening by removing said cover.

9. The steam trap in claim 8, wherein said nozzle insert bore has a circular cross-section that includes:
a first region for accepting working fluid from said nozzle holder inlet; and
a second region having a smaller diameter than said first region for reducing the pressure of the working fluid by an amount sufficient to cause at least a portion of the liquid fraction thereof to convert to a gaseous phase and at least partially restrict flow of the gaseous fraction through said nozzle insert.

10. The steam trap in claim 8, wherein said steam trap body includes a boss surrounding said discharge chamber and said cover is secured to said boss by bolts threaded into said steam trap body.

11. A steam trap for removing condensate from a process line of an apparatus carrying a working fluid including steam used by the apparatus, the steam trap comprising a steam trap body having an internal flow path from a trap inlet to a trap outlet, said trap inlet being constructed for introducing working fluid to said internal flow path from the process line at an operating temperature and pressure causing the working fluid to include a liquid fraction and a gaseous fraction during operation of the apparatus, wherein:
said steam trap includes a venturi nozzle comprising a single, straight-line venturi flow path portion that forms the only venturi nozzle in said internal flow path between said trap inlet and said trap outlet, said straight-line venturi flow path portion being configured to reduce the pressure of working fluid in said internal flow path by an amount sufficient to cause at least a portion of the liquid fraction thereof to convert to a gaseous phase and at least partially restrict flow of the gaseous fraction through said straight-line venturi flow path portion while discharging as condensate another portion of the liquid fraction at a pressure less than the operating pressure;

said straight-line venturi flow path portion is formed by a through passage in a condensate nozzle secured to said steam trap body and having a nozzle inlet in fluid communication with said trap inlet for introducing said process fluid therein to said through passage and a nozzle outlet for discharging said condensate from said through passage into a reduced pressure region of said internal flow path forming a discharge chamber in fluid communication with said trap outlet for discharging from said steam trap body condensate discharged from said nozzle outlet;

said straight-line venturi flow path portion of said internal steam trap flow path is substantially parallel with the direction of working fluid flow at said trap inlet; and said discharge chamber has an access opening sealed by a removable cover to provide access to said condensate nozzle.

12. The steam trap in claim 11, wherein said condensate nozzle is removably secured to said steam trap body.

13. A nozzle cartridge for mounting to a steam trap to remove condensate from a process line of an apparatus carrying a working fluid including steam used by the apparatus, the steam trap comprising a steam trap body having an internal flow path from a trap inlet to a trap outlet, said trap inlet being constructed for introducing working fluid to the internal flow path from the process line at a temperature and pressure causing the working fluid to include a liquid fraction and a gaseous fraction, wherein:

said nozzle cartridge comprises a nozzle inlet, a nozzle outlet, and a through passage between said nozzle inlet and said nozzle for forming a straight-line venturi flow path configured to reduce the pressure of the working fluid introduced to said nozzle inlet by an amount sufficient to cause at least a portion of the liquid fraction thereof to convert to a gaseous phase and at least partially restrict flow of the gaseous fraction through said venturi flow path while discharging another portion of the liquid fraction through said nozzle outlet as condensate at a pressure less than the operating pressure;

said nozzle cartridge includes mounting structure for removably securing said nozzle cartridge in a reduced pressure region of the steam trap body by removable fasteners with a surface of said mounting structure sealed to an inlet of the reduced pressure region to form a single venturi flow path between the trap inlet and the trap outlet; and said removable fasteners are accessible via an access opening in the reduced pressure region sealed by a cover removably secured to the steam trap body.

14. The nozzle cartridge in claim 13, further comprising a nozzle holder with a nozzle insert for forming at least a part of said through passage, wherein:

said nozzle insert has a nozzle insert bore with a cross-sectional area varying in the direction of fluid flow for varying the pressure of the working fluid passing therethrough; and said nozzle holder is constructed to be removably secured to the steam trap body by said removable fasteners with said nozzle inlet in fluid communication with the trap inlet.

15. The nozzle cartridge in claim 14, wherein:

said nozzle holder includes a nozzle holder mounting portion having a nozzle insert mount including a mounting surface constructed to be removably secured by the fasteners to a surface of the steam trap body with said nozzle insert mount disposed in a discharge chamber formed by the reduced pressure region; and nozzle insert is removably secured to said nozzle holder insert mount.

16. The nozzle cartridge in claim 15, wherein said nozzle insert bore has a circular cross-section that includes:

a first region for accepting working fluid from said nozzle inlet; and a second region having a smaller diameter than said first region for reducing the pressure of the working fluid by an amount sufficient to cause at least a portion of the liquid fraction thereof to convert to a gaseous phase and at least partially restrict flow of the gaseous fraction through said nozzle insert bore.

17. The nozzle cartridge in claim 13, wherein:

said nozzle insert has a cross-sectional area substantially constant in the direction of fluid flow; and said nozzle holder and said nozzle insert comprise said through passage having a cross-sectional area for varying the pressure of the working fluid passing through said nozzle cartridge.

18. The nozzle cartridge in claim 17, wherein said nozzle holder and said nozzle insert have circular cross-sections with coincident centerlines, said nozzle insert having a smaller diameter than said nozzle holder for reducing the pressure of the working fluid to cause a portion of the liquid fraction thereof to convert to a gaseous phase and at least partially restrict flow of the gaseous fraction through said nozzle insert bore.

19. A condensate removal trap for removing condensate from a process line of an apparatus carrying a working fluid used by the apparatus, the condensate removal trap comprising a trap body having an internal flow path from a trap inlet to a trap outlet, said trap inlet being constructed for introducing working fluid to said internal flow path from the process line at an operating temperature and pressure causing the working fluid to include a liquid fraction and a gaseous fraction during operation of the apparatus, wherein:

said trap includes a venturi nozzle comprising a single, straight-line venturi flow path portion that forms the only venturi nozzle in said internal flow path between said trap inlet and said trap outlet, said straight-line venturi flow path portion being configured to reduce the pressure of working fluid in said internal flow path by an amount sufficient to cause at least a portion of the liquid fraction thereof to convert to a gaseous phase and at least partially restrict flow of the gaseous fraction through said straight-line venturi flow path portion while discharging as condensate another portion of the liquid fraction at a pressure less than the operating pressure;

said straight-line venturi flow path portion is formed by a through passage in a condensate nozzle secured to said trap body and having a nozzle inlet in fluid communication with said trap inlet for introducing said process fluid therein to said through passage and a nozzle outlet for discharging said condensate from said through passage into a reduced pressure region of said internal flow path forming a discharge chamber in fluid communication with said trap outlet for discharging from said trap body condensate discharged from said nozzle outlet;

said straight-line venturi flow path portion of said internal trap flow path is substantially parallel with the direction of working fluid flow at said trap inlet;

said discharge chamber has an access opening sealed by a removable cover to provide access to said condensate nozzle, removably secured in said discharge chamber in the reduced pressure region of the trap body by removable fasteners with a mounting structure surface sealed to an inlet of the reduced pressure region to form the single straight-line venturi flow path between the trap inlet and the trap outlet; and said removable fasteners are accessible via the access opening in the reduced pressure region sealed by the cover removably secured to the trap body.

20. The condensate removal trap in claim 19, wherein said condensate nozzle is removably secured to said trap body.

* * * * *